July 31, 1956 — J. H. TERRY — 2,757,105
CERAMIC COATING FOR COMPRESSOR BLADES, COATED
BLADES AND METHOD OF MAKING SAME
Filed Feb. 28, 1955

Inventor
Jack H. Terry
By Smith, Olsen, Baird
& Gulbrandsen,
Attys.

United States Patent Office 2,757,105
Patented July 31, 1956

2,757,105

CERAMIC COATING FOR COMPRESSOR BLADES, COATED BLADES AND METHOD OF MAKING SAME

Jack H. Terry, Wauwatosa, Wis., assignor to General Electric Company, a corporation of New York Application February 28, 1955, Serial No. 490,780

12 Claims. (Cl. 117—119)

The present invention relates to ceramic coatings for compressor blades or the like, and methods of applying the ceramic coating to the blades.

The ceramic coating of the invention has particular utility when applied to compressor blades used with aircraft gas turbines and accordingly will be described as applied thereto. Blades in such applications are subjected to extremes in temperature since the incoming air may be very cold, particularly when starting the engine, yet after the engine has been started the temperature of the compressed gases can rise to relatively high values. In addition, the incoming gas may be relatively corrosive and may carry particles which have an appreciable abrasive action on any parts, including the compressor blades, with which they come in contact.

Accordingly, it is an important object of the present invention to provide an improved compressor blade or the like and particularly an improved compressor blade having a shaped metal body provided with a protective enamel coating.

More specifically it is an object of the invention to provide a coated compressor blade or the like in which the coating provides a measure of heat insulation for the metal body thereof and further protects the metal body from corrosion and abrasion.

Another object of the invention is to provide an improved compressor blade or the like including a metallic structure having exposed portions thereof covered with a protective and adherent ceramic coating, the coating being compatible with the metallic structure to give good adherence therebetween and to provide substantially the same coefficient of expansion for the ceramic coating and the metallic body whereby the blade can withstand extreme thermal shock.

Another object of the invention is to provide a metallic blade for a compressor or the like with a ceramic coating that greatly increases the normal operating life thereof with respect to ultimate fatigue failure.

Yet another object of the invention is to provide a ceramic coated compressor blade or the like in which the ceramic coating has a controlled thickness thereby to achieve the above objects and advantages.

Still another object of the invention is to provide a blade having thereon a single layer coating tightly adhered thereto and applied in one step.

A further object of the invention is to provide an improved method of applying ceramic coatings to compressor blades or the like including improved annealing and firing steps.

These and other objects and advantages of the invention will be better understood from the following description when taken in conjunction with the accompanying drawing. In the drawing wherein like reference nuerals have been utilized to designate like parts throughout:

Figure 1:
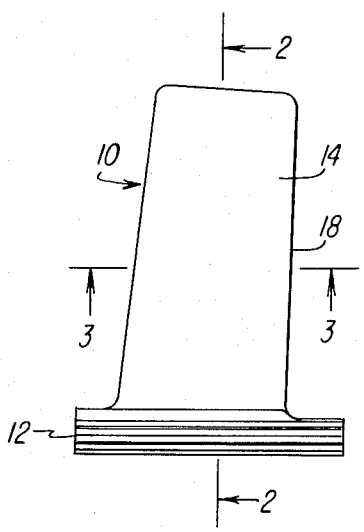
Figure 1 is a side elevational view of a compressor blade provided with a ceramic coating in accordance with the present invention.
Figure 2:
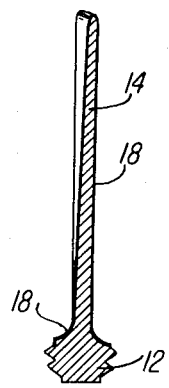
Figure 2 is an enlarged view in vertical section through the blade of Figure 1 substantially as seen in the direction of the arrows along the line 2—2 of Figure 1.
Figure 3:
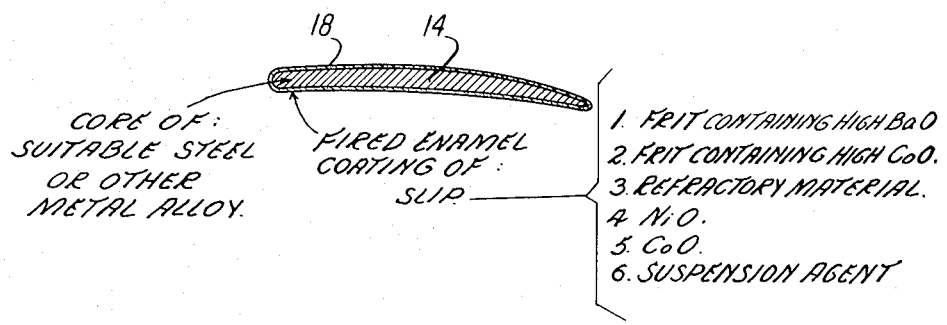
Figure 3 is a view in section through the blade of Figure 1 substantially as seen in the direction of the arrows along the lines 3—3 of Figure 1.

Referring to the drawings, there is shown a compressor blade generally designated by the numeral 10 which has certain portions thereof covered with a ceramic coating having the composition and applied by the method of the present invention. Blade 10 as illustrated is particularly useful when used in compressors in conjunction with aircraft gas turbine engines. In such applications, the function of the compressor of which blade 10 is a part is to take air at relatively low temperatures and compress it. The compression of the air raises the temperature thereof substantially and accordingly the blades 10 may be subjected to extremely low and relatively high temperatures within a very short space of time. Particularly when the associated engine is being started, the blades 10 are relatively cool and immediately upon starting of the engine blade 10 is heated to a relatively high temperature.

Although the compressor of such an engine is screened to prevent the incoming air from carrying large objects thereinto, small particles, dust, etc., carried by the air are drawn into the compressor and impinge upon the blade 10 at relatively high velocities. These particles exert a considerable abrasive action against the blades unless the blades are protected. Similarly, the incoming air may carry with it corrosive materials including water vapor, sulphur dioxide, various nitrogen oxides and the like.

Blade 10 includes an attachment portion or root 12 to which integrally is attached the blade proper or air foil 14 and the material for construction of blade 10 is preferably a metal alloy which can withstand the extreme operating conditions encountered. The lower part of attachment portion 12 as viewed in Figure 1 is preferably not coated, but the remaining portions of blade 10 are preferably covered with an adherent ceramic coating in accordance with the present invention. The ceramic coating is generally designated by the numeral 18 throughout the drawing.

Ceramic coating 18 is formed generally from a mixture of a first frit having a high barium oxide content, a second frit having a high cobalt oxide content, a quantity of refractory material, a quantity of adhesion enhancing material and a suspension material. The various ingredients which comprise the slip are adjusted to the proper consistency and fineness and applied to the blade 10. Prior to application of the ceramic slip to the base metal, the base metal is carefully cleaned. The slip is applied to a controlled thickness and the coated blade then preheated, fired in a slightly reducing atmosphere, and then afterheated and tempered. A portion of the ceramic coating on the attachment portion 12 is removed by light sand blasting after firing and thereafter coated with a rust preventative.

The following example is given to further illustrate the present invention. It is to be understood that this example is given only for purposes of illustration and is not to be construed as a limitation on the invention.

EXAMPLE I

The slip from which is formed ceramic coating 18 is made as follows: A frit No. 1 having a high barium oxide content is chosen, and a frit No. 2 having a high cobalt oxide content is chosen. Both frits Nos. 1 and 2 may be described as molybdenum silicate glasses. These frits may have the following compositions by weight:

| Ingredient | Frit No. 1 Percent | Frit No. 2 Percent |
| --- | --- | --- |
| Silica | 32.0 | 40.5 |
| Borax | 22.0 | 30.0 |
| Aluminum Hydrate | 2.0 | 5.0 |
| Molybdenum Oxide | 3.0 | 3.0 |
| Barium Oxide | 36.0 | 0.0 |
| Cobalt Oxide | 0.0 | 2.5 |
| Fluorspar | 0.0 | 7.0 |
| Sodium Nitrate | 0.0 | 12.0 |
| Zinc Oxide | 5.0 | 0.0 |
|  | 100.0 | 100.0 |

Fifty parts by weight of frit No. 1 are then mixed with eighteen parts by weight of frit No. 2 to give a composite blended frit. To the blended frits is then added twenty-two parts by weight of silica, one part by weight of nickel oxide, two parts by weight of cobalt oxide, five parts by weight of clay, one sixteenth part by weight of bentonite, one sixteenth part by weight of sodium nitrate and sixty parts by weight of water. This mixture is then milled to a fineness such that only .03 per cent by weight is retained on a 325 mesh standard U. S. screen. The specific gravity of the milled mixture is then adjusted to a value of 1.70 to produce the finished slip.

The bare metal compressor blade to be coated has the surface thereof prepared for coating in the following manner. The surface is first treated with a degrease or emulsion cleaner and rinsed. A mixture comprising fifty parts by weight of trisodium phosphate, thirty parts by weight of sodium metasilicate and twenty parts by weight of soda ash provides a suitable alkaline cleaning solution, when four ounces of the above mixture are used in a gallon of water. The blade is then cleaned in this alkali cleaning solution with the solution at its boiling temperature. After rinsing and drying the blade is sand blasted with a thirty grit flint sand under a pressure not in excess of five pounds per square inch of the blade, this low pressure of the sand blasting being employed to prevent work hardening.

Next, the cleaned compressor blade is coated with the above described slip to produce a finished fired thickness of 0.001 inch. Then, in a suitable furnace having preheating and afterheating facilities, the coated blade is fired for thirty minutes at a temperature of 1740° F. in a slightly reducing atmosphere. The atmosphere is composed of the following parts by volume of gases: 11.0 parts hydrogen, 8.2 parts carbon monoxide, 6.2 parts carbon dioxide, 1.5 parts methane and 73.1 parts nitrogen.

After firing and afterheating, the coated blade is tempered for six hours at a temperature of 1165° F. in air. The blade is then permitted to cool to substantially room temperature, after which the coating on the air foil and the top of the attachment portion 12 is protected with rubber masks and the coating is removed from the remainder of the attachment portion 12 by light sand blasting at a pressure of five pounds per square inch at the work surface, using a thirty grit flint sand. After the sand blasting operation, the rubber masks are removed and the sand blasted areas of the attachment portion 12 are coated with a rust preventative.

Examination of the ceramic coated blade disclosed that the coating 18 was tightly adhered to the metal base throughout the area thereof. It further was noted that the ceramic coating 18 was uniform in thickness and appearance at all points and there was no evidence of spalling or cracking. It is believed that these desirable characteristics result at least in part from the fact that the ceramic coating is applied as a single layer by one firing operation.

When the coated blade was tested in its intended environment, it was found that the ceramic coating 18 protects the base metal of the blade against the heat generated during operation of the compressor, and furthermore that the ceramic coating effectively protected the base metal from corrosion and abrasion. More specifically, there was no indication of corrosion of blade 10 even when the blade was exposed to highly corrosive atmospheres including water vapor, sulphur dioxide, or various oxides of nitrogen. There also was no indication that small particles of sand and the like in the gas stream impinging upon blade 10 caused abrasion thereof.

There was every indication of good compatibility between the base metal of compressor blade 10 and the ceramic coating 18 since there was good adherence at all points of contact therebetween. Furthermore, the coefficient of expansion of the base metal and the coating 18 appeared to be so nearly equal that the finished and coated blade 10 could withstand extreme thermal shock without any evidence of spalling, cracking or breaking away of the ceramic coating 18 from the base metal.

Further, in use in the compressor of a gas turbine, it has been discovered that the ceramic coating 18 upon the blade 10 effects a great increase in the normal operating life of the blade 10 with respect to ultimate fatigue failure. The exact mechanism of this phenomenon is not understood, but it is very pronounced, and the increased resistance to fatigue failure may flow from the protection afforded by the ceramic coating 18 against minute surface scratches in the air foil of the blade 10. In any case, in fatigue failure tests the ceramic coated blades always have a very greatly extended useful life with respect to identical uncoated blades, thereby materially extending the safe operating time interval of the compressor of a gas turbine engine and substantially reducing the hazard of such failure in the engine.

Frit No. 1 was specifically chosen for its high barium oxide content. It has been found, based on estimates from partial analytical surveys that frit No. 1 is satisfactory in use if its composition is within the following range:

*Ingredients*

| | Percent |
| --- | --- |
| Silica | 28.0–34.0 |
| Borax | 10.0–30.0 |
| Aluminum hydrate | 1.0–3.0 |
| Molybdenum oxide | .5–4.5 |
| Barium oxide | 30.0–40.0 |
| Zinc oxide | 2.0–7.0 |

Frit No. 2 was chosen for its high cobalt oxide content. Satisfactory results have been obtained if the composition of frit No. 2 is within the ranges based on partial analytical surveys shown in the following table:

*Ingredients*

| | Percent |
| --- | --- |
| Silica | 38.0–42.0 |
| Borax | 27.0–33.0 |
| Aluminum hydrate | 4.0–6.0 |
| Molybdenum | .5–4.5 |
| Cobalt oxide | .5–3.0 |
| Fluorspar | 2.0–10.0 |
| Sodium nitrate | 8.0–15.0 |

In making the composite blended frits from frits Nos. 1 and 2, as little as forty parts by weight or up to as much as seventy parts by weight or more of frit No. 1 can be used with as little as ten parts by weight or up to forty parts by weight or more of frit No. 2. The good high temperature resistance properties of frit No. 1 and the good adhesion properties of frit No. 2 are further enhanced by adding the additional ingredients. More specifically, the nickel oxide and the cobalt oxide added to frits Nos. 1 and 2 increase the adhesion of the finished ceramic slip. Instead of one part by weight of nickel oxide disclosed in Example I, as little as 0.25 part by weight and up to five parts by weight of nickel oxide may be used. Similarly, as little as 0.25 part by weight of cobalt oxide and up to five parts by weight of cobalt oxide may be used instead of the two parts by weight disclosed in Example I.

The silica in this slip is added for its refractory properties. The amount of silica used may be slightly more or less and good results have been obtained when using as little as ten parts by weight of silica and up to as much as forty parts by weight of silica. Examples of other good refractory materials which could be used to replace part or all of the silica are feldspar, calcined alumina, zirconium oxide and quartz.

The clay, bentonite and sodium nitrite serve as suspension agents in the slip formulation. Satisfactory compositions have been made with as little as three parts by weight of clay, or as many as eight parts by weight of clay, instead of the five parts by weight disclosed in Example I. Similarly, the amounts of bentonite and sodium nitrite can be slightly increased or decreased and still produce satisfactory fired ceramic coatings. Another suspension agent which may be used in Example I is potassium nitrite.

The various ingredients making up the ceramic slip of the present invention after being mixed together are milled to a desired degree of fineness. It has been found that satisfactory fired ceramic coatings are produced if the fineness of the materials is such that when 100 cc. of the blended slip is applied to a 325 mesh U. S. standard screen pursuant to standard ceramic engineering test practice, between 0.1 to 0.5 gram of the material is retained on the screen. Before applying the slip to the part to be coated, the specific gravity of the slip is preferably adjusted to the value between 1.70 and about 1.80.

It further has been found that frits Nos. 1 and 2 and the nickel oxide and cobalt oxide must be added as separate physical entities to the coating composition if the desired characteristics of the fired ceramic coating are to be achieved as a synergistic combination of the desired individual characteristics of the individual ingredients. More specifically, it has been found that if a single frit having the combined analysis of frits Nos. 1 and 2 is prepared, the fired ceramic coating obtained from this slip does not have the same desirable physical properties as does the coating obtained when frits Nos. 1 and 2 are incorporated in the slip as separate entities.

Any other suitable method of degreasing and cleaning the uncoated metal part can be used instead of that specifically described in Example I.

It is desirable to control the thickness of the finished ceramic coating. A preferred range of thickness of the finished coating is 0.001 inch to 0.002 inch.

The firing temperature of 1740° F. can be slightly decreased or slightly increased provided the time of firing is correspondingly changed to give the desired amount of heating to the ceramic coating. The analysis of the firing atmosphere can also be changed from that described in Example I above, provided the slightly reduced characteristics of the atmosphere are preserved. Similarly, the tempering temperature can be slightly increased or slightly decreased provided the tempering time is adjusted correspondingly.

Any portions of the work piece being coated which should not have a ceramic coating thereon can have the unfired slip removed by brushing prior to firing. Alternatively, the fired ceramic coating can be removed from the selected portions of the blade by a light sandblasting. Preferably a suitable rust preventative is applied to any portions of the base metal which are not covered with the fired ceramic coating.

It will be seen that there has been provided an improved ceramic coating and a method of applying the ceramic coating which fulfills all of the objects and advantages set forth above. Although certain preferred examples of the invention have been given for purposes of illustration, it is to be understood that various changes and modifications can be made therein without departing from the spirit and scope of the invention.

What is claimed is:

1. A heat resistant and corrosion resistant blade for a gas compressor or the like comprising a shaped metal base coated with a layer of heat resistant and corrosion resistant fired enamel intimately bonded thereto and consisting essentially of a fired enamel slip; said slip comprising by weight about 40 to 70 parts of a frit having a high barium oxide content of from about 30% to about 40% by weight, about 10 to 40 parts of a frit having a high cobalt oxide content of from about 0.5% to about 3.0 by weight, about 10 to 40 parts by weight of refractory material, about 0.25 to 5 parts nickel oxide, about 0.25 to 5 parts cobalt oxide, and about 3 to 8 parts suspension agent.

2. A heat resistant and corrosion resistant blade as set forth in claim 1; wherein the frit having a high barium oxide content comprises by weight about 28.0 to 34.0 parts silica, about 10.0 to 30.0 parts borax, about 1.0 to 3.0 parts aluminum hydrate, about 0.5 to 4.5 parts molybdenum oxide, about 30.0 to 40.0 parts barium oxide, and about 2.0 to 7.0 parts zinc oxide; and the frit having a high cobalt oxide content comprising by weight about 38.0 to 42.0 parts silica, about 27.0 to 33.0 parts borax, about 4.0 to 6.0 parts aluminum hydrate, about 0.5 to 4.5 parts molybdenum oxide, about 0.5 to 3.0 parts cobalt oxide, about 2.0 to 10.0 parts fluorspar, and about 8.0 to 15.0 parts sodium nitrate.

3. A heat resistant and corrosion resistant blade as set forth in claim 1; wherein the refractory material is chosen from the group consisting of silica, feldspar, calcined alumina, zirconium oxide, and quartz; and wherein the suspension agent is selected from the group consisting of clay, alkali metal nitrites, and bentonite.

4. A heat resistant and corrosion resistant blade as set forth in claim 1; wherein the refractory agent is silica; and the suspension agent is a mixture of clay, bentonite and sodium nitrite.

5. A heat resistant and corrosion resistant blade as set forth in claim 2; wherein the slip further comprises about 1 part by weight of nickel oxide, and about 2 parts by weight of cobalt oxide; wherein about 50 parts by weight of the frit having a high barium oxide content is used with about 18 parts by weight of the frit having a high cobalt oxide content; wherein the refractory agent is about 22 parts by weight of silica; and wherein the suspension agent is about 5 parts by weight of clay, about 1/16 part by weight of bentonite, and about 1/16 part by weight of sodium nitrite.

6. The method of applying fired enamel coatings to blades for compressors or the like, comprising the steps of cleaning the blade, applying a coating of enamel slip to said blade, and firing the coated blade at an elevated temperature in a reducing atmosphere to produce a ceramic coated blade; said enamel slip comprising by weight about 40 to 70 parts of a frit having a high barium oxide content of from about 30% to about 40% by weight, about 10 to 40 parts of a frit having a high cobalt oxide content of from about 0.5% to about 3.0% by weight, about 10 to 40 parts by weight of refractory material, about 0.25 to 5 parts nickel oxide, about 0.25 to 5 parts cobalt oxide, and about 3 to 8 parts suspension agent.

7. The method of applying fired enamel coatings as set forth in claim 6, wherein the firing is carried out at about 1740° F. in a reducing atmosphere comprising by volume about 11 parts hydrogen, about 8.2 parts carbon monoxide, about 6.0 parts carbon dioxide, about 1.5 parts methane, and about 73.1 parts nitrogen.

8. The method of applying fired enamel coatings as set forth in claim 6, wherein the enamel slip is milled to a fineness such that only about 0.1 to 0.5% is retained on a 325 mesh U. S. standard screen, the specific gravity of the slip is adjusted to about 1.70 to 1.80, and the slip is applied in a thickness such that the fired coating has a thickness of about 0.001 to 0.002 inch.

9. The method of applying fired enamel coatings as set forth in claim 6, wherein the enamel slip comprises by weight about 40 to 70 parts of a frit having a high barium oxide content, about 10 to 40 parts of a frit having a high cobalt oxide content, about 10 to 40 parts of a refractory material chosen from the group consisting of silica, feldspar, calcined alumina, zirconium oxide and quartz, about 0.25 to 5 parts nickel oxide, about 0.25 to 5 parts cobalt oxide, and about 3 to 8 parts suspension agent selected from the group consisting of clay, alkali metal nitrites, and bentonite.

10. The method of applying fired enamel coatings to blades for compressors or the like, comprising the steps of cleaning the blade, thereafter sandblasting the blade with a 30 grit sand at a pressure of 5 pounds per square inch at the work surface, applying a coating of enamel slip to said blade in a thickness such that the fired coating has a thickness of from about 0.001 to 0.002 inch, and firing the coated blade at a temperature of about 1740° F. for about 30 minutes in an atmosphere comprising by volume about 11 parts hydrogen, 8.2 parts carbon monoxide, 6.2 parts carbon dioxide, 1.5 parts methane and 73.1 parts nitrogen; said enamel slip comprising by weight about 50 parts of a frit having a high barium oxide content, about 18 parts of a frit having a high cobalt oxide content, about 22 parts silica, about 1 part nickel oxide, about 2 parts cobalt oxide, about 5 parts clay, about $1/16$ part bentonite, and about $1/16$ part of sodium nitrite; said frit having a high barium oxide content comprising by weight about 28.0 to 34.0 parts silica, about 10.0 to 30.0 parts borax, about 1.0 to 3.0 parts aluminum hydrate, about 0.5 to 4.5 parts molybdenum oxide, about 30.0 to 40.0 parts barium oxide, and about 2.0 to 7.0 parts zinc oxide; and said frit having a high cobalt oxide content comprising by weight about 38.0 to 42.0 parts silica, about 27.0 to 33.0 parts borax, about 4.0 to 6.0 parts aluminum hydrate, about 0.5 to 4.5 parts molybdenum oxide, about 0.5 to 3.0 parts cobalt oxide, about 2.0 to 10.0 parts fluorspar, and about 8.0 to 15.0 sodium nitrate.

11. A ceramic coating slip comprising by weight about 40 to 70 parts of a frit having a high barium oxide content of from about 30% to about 40% by weight, about 10 to 40 parts of a frit having a high cobalt oxide content of from about 0.5% to about 3.0% by weight, about 10 to 40 parts by weight of refractory material, about 0.25 to 5 parts nickel oxide, about 0.25 to 5 parts cobalt oxide, and about 3 to 8 parts suspension agent.

12. A ceramic coating slip comprising by weight about 50 parts of a frit having a high barium oxide content, about 18 parts of a frit having a high cobalt oxide content, about 22 parts silica, about 1 part nickel oxide, about 2 parts cobalt oxide, about 5 parts clay, about $1/16$ part bentonite, and about $1/16$ part of sodium nitrite; said frit having a high barium oxide content comprising by weight about 28.0 to 34.0 parts silica, about 10.0 to 30.0 parts borax, about 1.0 to 3.0 parts aluminum hydrate, about 0.5 to 4.5 parts molybdenum oxide, about 30.0 to 40.0 parts barium oxide, and about 2.0 to 7.0 parts zinc oxide; and said frit having a high cobalt oxide content comprising by weight about 38.0 to 42.0 parts silica, about 27.0 to 33.0 parts borax, about 4.0 to 6.0 parts aluminum hydrate, about 0.5 to 4.5 parts molybdenum oxide, about 0.5 to 3.0 parts cobalt oxide, about 2.0 to 10.0 parts fluorspar, and about 8.0 to 15.0 sodium nitrate.

References Cited in the file of this patent

UNITED STATES PATENTS

| | | |
|---|---|---|
| 2,361,376 | Athy | Oct. 31, 1944 |
| 2,475,469 | Bennett | July 5, 1949 |
| 2,662,020 | Schofield | Dec. 8, 1953 |

OTHER REFERENCES

Poste: "Jour. of Am. Ceramic Soc.," vol. 2, No. 12, Dec. 1919, pages 951, 952, 957 and 958.